United States Patent
Yang et al.

(10) Patent No.: US 9,558,689 B2
(45) Date of Patent: Jan. 31, 2017

(54) PIXEL STRUCTURE AND DISPLAY PANEL

(71) Applicants: Shanghai Tianma Micro-Electronics Co., Ltd., Shanghai (CN); Tianma Micro-Electronics Co., Ltd., Shenzhen (CN)

(72) Inventors: Kang Yang, Shanghai (CN); Jun Ma, Shanghai (CN); Tianyi Wu, Shanghai (CN); Hao Chen, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 69 days.

(21) Appl. No.: 14/098,268

(22) Filed: Dec. 5, 2013

(65) Prior Publication Data
US 2015/0002376 A1    Jan. 1, 2015

(30) Foreign Application Priority Data
Jun. 28, 2013    (CN) .......................... 2013 1 0271048

(51) Int. Cl.
*G09G 3/20*    (2006.01)
*G09G 3/36*    (2006.01)

(52) U.S. Cl.
CPC .......... *G09G 3/2003* (2013.01); *G09G 3/3607* (2013.01); *G09G 3/3614* (2013.01);
(Continued)

(58) Field of Classification Search
CPC .. G09G 3/2003; G09G 3/3607; G09G 3/3614; G09G 2300/0413; G09G 2300/043; G09G 2320/0209; G09G 2320/0233
(Continued)

(56) References Cited

U.S. PATENT DOCUMENTS

2005/0184980 A1    8/2005    Sato et al.
2009/0225015 A1*   9/2009    Itoh ................... G02F 1/136286
                                                             345/84
(Continued)

FOREIGN PATENT DOCUMENTS

EP          2498126 A1       9/2012
KR    10-2006-0077952 A      7/2006
WO       2007129425 A1      11/2007

OTHER PUBLICATIONS

Partial European Search Report for European Application No. 13197450.3, mailed Nov. 4, 2014, 7 pages total.
(Continued)

*Primary Examiner* — Kwin Xie
(74) *Attorney, Agent, or Firm* — Alston & Bird LLP

(57) ABSTRACT

A pixel structure includes a plurality of red sub-pixels, white sub-pixels, blue sub-pixels and green sub-pixels, which are arranged to form a plurality of first sub-pixel cells and second sub-pixel cells. The first and second sub-pixel cells may be arranged to form a plurality of pixel cells. The pixel cells may be arranged in the vertical direction repeatedly to form a plurality of pixel array cells. The pixel array cells may be arranged in the horizontal direction repeatedly to form a plurality of pixel arrays. The pixel structure further includes a supplement pixel array disposed in the pixel arrays according to a preset mode and configured to supplement polarity inversion in the pixel structure. The sub-pixels with a same color in a same row in a same signal frame may not have a same polarity, thereby reducing flicker and horizontal crosstalk of images and improving the image display quality.

18 Claims, 5 Drawing Sheets

(52) U.S. Cl.
CPC ............. *G09G 2300/043* (2013.01); *G09G 2300/0413* (2013.01); *G09G 2320/0209* (2013.01); *G09G 2320/0233* (2013.01)

(58) Field of Classification Search
USPC ....................................................... 345/690
See application file for complete search history.

(56) References Cited

U.S. PATENT DOCUMENTS

| | | | |
|---|---|---|---|
| 2011/0304660 A1 | 12/2011 | Liao et al. | |
| 2012/0218248 A1* | 8/2012 | Tsubata | 345/211 |
| 2012/0287170 A1* | 11/2012 | Cheng et al. | 345/690 |
| 2013/0050282 A1* | 2/2013 | Kim et al. | 345/690 |
| 2014/0118657 A1* | 5/2014 | Duan | G02F 1/136286 349/46 |

OTHER PUBLICATIONS

Extended European Search Report for European Application No. 13197450.3, mailed on Mar. 18, 2015, 13 pages total.

* cited by examiner

|   |   |   |   |
|---|---|---|---|
| R | G |   |   |
| W | B |   |   |

|   |   |
|---|---|
| W | B |
| R | G |

11      12

| R | G | W | B |
|---|---|---|---|
| W | B | R | G |

| R+ | G- | W+ | B- | R+ | G- | W+ | B- |
|----|----|----|----|----|----|----|----|
| W+ | B- | R+ | G- | W+ | B- | R+ | G- |
| R+ | G- | W+ | B- | R+ | G- | W+ | B- |
| W+ | B- | R+ | G- | W+ | B- | R+ | G- |
| R+ | G- | W+ | B- | R+ | G- | W+ | B- |
| W+ | B- | R+ | G- | W+ | B- | R+ | G- |

*Fig. 2a (related art)*

| R+ | G- | W+ | B- | R+ | G- | W+ | B- |
|----|----|----|----|----|----|----|----|
| W- | B+ | R- | G+ | W- | B+ | R- | G+ |
| R+ | G- | W+ | B- | R+ | G- | W+ | B- |
| W- | B+ | R- | G+ | W- | B+ | R- | G+ |
| R+ | G- | W+ | B- | R+ | G- | W+ | B- |
| W- | B+ | R- | G+ | W- | B+ | R- | G+ |

*Fig. 2b (related art)*

| R+ | G+ | W- | B- | R+ | G+ | W- | B- |
|---|---|---|---|---|---|---|---|
| W+ | B+ | R- | G- | W+ | B+ | R- | G- |
| R+ | G+ | W- | B- | R+ | G+ | W- | B- |
| W+ | B+ | R- | G- | W+ | B+ | R- | G- |
| R+ | G+ | W- | B- | R+ | G+ | W- | B- |
| W+ | B+ | R- | G- | W+ | B+ | R- | G- |

*Fig. 3 (prior art)*

| R+ | G- | W+ | B- | + | R- | G+ | R- | G+ | - | R+ | G- | W+ | B- |
|---|---|---|---|---|---|---|---|---|---|---|---|---|---|
| W+ | B- | R+ | G- | + | W- | B+ | W- | B+ | - | W+ | B- | R+ | G- |
| R+ | G- | W+ | B- | + | R- | G+ | R- | G+ | - | R+ | G- | W+ | B- |
| W+ | B- | R+ | G- | + | W- | B+ | W- | B+ | - | W+ | B- | R+ | G- |
| R+ | G- | W+ | B- | + | R- | G+ | R- | G+ | - | R+ | G- | W+ | B- |
| W+ | B- | R+ | G- | + | W- | B+ | W- | B+ | - | W+ | B- | R+ | G- |

| R+ | G- | W+ | B- | R+ | G- | W+ | B- | + | R- | G+ | R- | G+ | R- | G+ | R- | G+ | - |
|----|----|----|----|----|----|----|----|---|----|----|----|----|----|----|----|----|---|
| W+ | B- | R+ | G- | W+ | B- | R+ | G- | + | W- | B+ | W- | B+ | W- | B+ | W- | B+ | - |
| R+ | G- | W+ | B- | R+ | G- | W+ | B- | + | R- | G+ | R- | G+ | R- | G+ | R- | G+ | - |
| W+ | B- | R+ | G- | W+ | B- | R+ | G- | + | W- | B+ | W- | B+ | W- | B+ | W- | B+ | - |
| R+ | G- | W+ | B- | R+ | G- | W+ | B- | + | R- | G+ | R- | G+ | R- | G+ | R- | G+ | - |
| W+ | B- | R+ | G- | W+ | B- | R+ | G- | + | W- | B+ | W- | B+ | W- | B+ | W- | B+ | - |

| R+ | G- | + | W- | B+ | R- | G+ | - | W+ | B- | R+ | G- | + | W- | B+ |
|----|----|---|----|----|----|----|---|----|----|----|----|---|----|----|
| W+ | B- | + | R- | G+ | W- | B+ | - | R+ | G- | W+ | B- | + | R- | G+ |
| R+ | G- | + | W- | B+ | R- | G+ | - | W+ | B- | R+ | G- | + | W- | B+ |
| W+ | B- | + | R- | G+ | W- | B+ | - | R+ | G- | W+ | B- | + | R- | G+ |
| R+ | G- | + | W- | B+ | R- | G+ | - | W+ | B- | R+ | G- | + | W- | B+ |
| W+ | B- | + | R- | G+ | W- | B+ | - | R+ | G- | W+ | B- | + | R- | G+ |

| R+ | G- | + | W- | B+ | - | + | R- | G+ | - | W+ | B- | R+ | G- | + | W- | B+ | - | + | R- | G+ |
|---|---|---|---|---|---|---|---|---|---|---|---|---|---|---|---|---|---|---|---|---|
| W+ | B- | + | R- | G+ | - | + | W- | B+ | - | R+ | G- | W+ | B- | + | R- | G+ | - | + | W- | B+ |
| R+ | G- | + | W- | B+ | - | + | R- | G+ | - | W+ | B- | R+ | G- | + | W- | B+ | - | + | R- | G+ |
| W+ | B- | + | R- | G+ | - | + | W- | B+ | - | R+ | G- | W+ | B- | + | R- | G+ | - | + | W- | B+ |
| R+ | G- | + | W- | B+ | - | + | R- | G+ | - | W+ | B- | R+ | G- | + | W- | B+ | - | + | R- | G+ |
| W+ | B- | + | R- | G+ | - | + | W- | B+ | - | R+ | G- | W+ | B- | + | R- | G+ | - | + | W- | B+ |

| R+ | G- | W+ | B- | + | R- | G+ | R- | G+ | - | R+ | G- | W+ | B- |
|---|---|---|---|---|---|---|---|---|---|---|---|---|---|
| W- | B+ | R- | G+ | - | W+ | B- | W+ | B- | + | W- | B+ | R- | G+ |
| R+ | G- | W+ | B- | + | R- | G+ | R- | G+ | - | R+ | G- | W+ | B- |
| W- | B+ | R- | G+ | - | W+ | B- | W+ | B- | + | W- | B+ | R- | G+ |
| R+ | G- | W+ | B- | + | R- | G+ | R- | G+ | - | R+ | G- | W+ | B- |
| W- | B+ | R- | G+ | - | W+ | B- | W+ | B- | + | W- | B+ | R- | G+ |

81, 82

| R+ | G- | W+ | B- | + | R- | G+ | R- | G+ | - | R+ | G- | W+ | B- |
|----|----|----|----|---|----|----|----|----|---|----|----|----|----|
| W+ | B- | R+ | G- | + | W- | B+ | W- | B+ | - | W+ | B- | R+ | G- |
| R- | G+ | W- | B+ | - | R+ | G- | R+ | G- | + | R- | G+ | W- | B+ |
| W- | B+ | R- | G+ | - | W+ | B- | W+ | B- | + | W- | B+ | R- | G+ |
| R+ | G- | W+ | B- | + | R- | G+ | R- | G+ | - | R+ | G- | W+ | B- |
| W+ | B- | R+ | G- | + | W- | B+ | W- | B+ | - | W+ | B- | R+ | G- |

| R+ | G- | W+ | B- | + | R- | G+ | R- | G+ | - | R+ | G- | W+ | B- |
|----|----|----|----|---|----|----|----|----|---|----|----|----|----|
| W+ | B- | R+ | G- | + | W- | B+ | W- | B+ | - | W+ | B- | R+ | G- |
| R+ | G- | W+ | B- | + | R- | G+ | R- | G+ | - | R+ | G- | W+ | B- |
| W+ | B- | R+ | G- | + | W- | B+ | W- | B+ | - | W+ | B- | R+ | G- |
| R- | G+ | W- | B+ | - | R+ | G- | R+ | G- | + | R- | G+ | W- | B+ |
| W- | B+ | R- | G+ | - | W+ | B- | W+ | B- | + | W- | B+ | R- | G+ |

PIXEL STRUCTURE AND DISPLAY PANEL

CROSS-REFERENCES TO RELATED APPLICATIONS

This application claims the benefit of priority to Chinese Patent Application No. 201310271048.1, filed with the Chinese Patent Office on Jun. 28, 2013, and entitled "PIXEL STRUCTURE AND DISPLAY PANEL", the contents of which is incorporated herein by reference in its entirety.

FIELD OF THE DISCLOSURE

The present disclosure generally relates to a display, and more particularly, to a pixel structure and a display panel including the pixel structure.

BACKGROUND OF THE INVENTION

In conventional color display panels, a display unit, such as a pixel, generally includes three sub-pixels of different colors: red R, green G and blue B. The color and brightness a pixel displays may depend on the ratio of the three sub-pixels of different colors in the pixel. Therefore, a color display panel may be called a RGB display panel. However, in the RGB display panel, the brightness of a pixel generally only depends on an average value of brightness of sub-pixels, resulting in a low brightness and a high power consumption of the RCB display panel.

To solve the above problems, a RGBW pixel structure has been provided in related art. The RGBW pixel structure is an array including a plurality of same pixel cells. A pixel cell includes four sub-pixels of different colors: red R, green G, blue B and white W.

FIG. 1 schematically illustrates structures of a first sub-pixel cell 11 and a second sub-pixel cell 12 according to one embodiment. The first sub-pixel cell 11 and the second sub-pixel cell 12 constitute a pixel cell 1. A plurality of pixel cells are arranged repeatedly in an array to form a pixel structure.

FIG. 2a schematically illustrates a distribution diagram of sub-pixel polarities in a one-column inversion drive mode in related art. In such a drive mode, sub-pixels with a same color may have a same polarity. Red sub-pixels R and white sub-pixels W have a positive polarity, while green sub-pixels G and blue sub-pixels B have a negative polarity, which may result in strong flicker in image display and bad display quality. Referring to FIG. 2b, FIG. 2b schematically illustrates a distribution diagram of sub-pixel polarities in one-dot inversion drive mode in related art. In this manner, the problem that sub-pixels with a same color in a pixel cell have a same polarity may be avoided, however, a serious horizontal crosstalk may be generated.

FIG. 3 schematically illustrates a distribution diagram of sub-pixel polarities in a two-column inversion drive mode in related art. In this manner, a severe horizontal crosstalk may be generated, which affects the display quality.

BRIEF SUMMARY OF THE INVENTION

Embodiments of the present disclosure provide a pixel structure and a display panel are provided.

According to an embodiment, a pixel structure may include a plurality of red sub-pixels, white sub-pixels, blue sub-pixels and green sub-pixels, which are arranged to form a plurality of first sub-pixel cells and second sub-pixel cells. A first sub-pixel cell and a second sub-pixel cell may be arranged to form a pixel cell. The pixel cells may be arranged repeatedly in a vertical direction to form a plurality of pixel array cells. The pixel array cells may be arranged repeatedly in a horizontal direction to form a plurality of pixel arrays. The pixel structure also includes a supplement pixel array disposed between the pixel arrays according to a preset mode and configured to supplement array inversion in the pixel structure.

According to another embodiment, a display panel may include the above pixel structure.

In embodiments of the present disclosure, supplement pixel arrays are inserted into pixel arrays, thereby reducing flicker and horizontal crosstalk of images and improving the image display quality.

In a specific embodiment, the supplement pixel arrays are inserted into the pixel arrays so that the sub-pixels with a same color in a same row in a same signal frame may not have a same polarity, thereby reducing flicker and horizontal crosstalk of images.

BRIEF DESCRIPTION OF THE DRAWINGS

In order to clarify the objects, characteristics and advantages of the disclosure and related art, embodiments of present disclosure will be described in detail in conjunction with accompanying drawings of both the disclosure and related art. Obviously, the drawings are just examples and do not limit the scope of the disclosure. This invention may be embodied in many different forms and should not be construed as limited by the embodiments set forth herein. Rather, these embodiments are provided so that this disclosure will be thorough and complete, and will fully convey the scope of the invention to those skilled in the art.

FIG. 1 schematically illustrates structures of a first sub-pixel cell, a second sub-pixel cell and a RGBW pixel cell according to one embodiment of the present disclosure;

FIG. 2a schematically illustrates a distribution diagram of sub-pixel polarities in a one-column inversion drive mode in related art;

FIG. 2b schematically illustrates a distribution diagram of sub-pixel polarities in a one-dot inversion drive mode in related art;

FIG. 3 schematically illustrates a distribution diagram of sub-pixel polarities in a two-column inversion drive mode in related art;

FIG. 4 schematically illustrates a distribution diagram of sub-pixel polarities after inserting a supplement pixel array when a pixel electrode is driven with one-column inversion mode according to a first embodiment of the present disclosure;

FIG. 5 schematically illustrates a distribution diagram of sub-pixel polarities after inserting a supplement pixel array when a pixel electrode is driven with one-column inversion mode according to a second embodiment of the present disclosure;

FIG. 6 schematically illustrates a distribution diagram of sub-pixel polarities after inserting a supplement pixel array when a pixel electrode is driven with one-column inversion mode according to a third embodiment of the present disclosure;

FIG. 7 schematically illustrates a distribution diagram of sub-pixel polarities after inserting a supplement pixel array when a pixel electrode is driven with one-column inversion mode according to a fourth embodiment of the present disclosure;

FIG. 8 schematically illustrates a distribution diagram of sub-pixel polarities after inserting a supplement pixel array when a pixel electrode is driven with one-dot inversion mode according to one embodiment of the present disclosure;

FIG. 9 schematically illustrates a distribution diagram of sub-pixel polarities after inserting a supplement pixel array when a pixel electrode is driven with a two-dot inversion mode according to one embodiment of the present disclosure; and FIG. 10 schematically illustrates a distribution diagram of sub-pixel polarities after inserting a supplement pixel array when a pixel electrode is driven with a four-dot inversion mode according to one embodiment of the present disclosure.

DETAILED DESCRIPTION OF THE INVENTION

In order to clarify the objects, characteristics and advantages of the disclosure, embodiments of present disclosure will be described in detail in conjunction with accompanying drawings. It should be appreciated that the drawings are merely examples, which should not unduly limit the scope of the claims herein. One of ordinary skill in the art would recognize other variations, modifications, and alternatives.

Referring to FIG. 1, in some embodiments, a red sub-pixel R, a green sub-pixel G, a blue sub-pixel B and a white sub-pixel W are arranged in a 2-by-2 matrix to form a first sub-pixel cell 11 and a second sub-pixel cell 12. The first sub-pixel cell 11 and the second sub-pixel cell 12 are arranged to form a pixel cell 1. The pixel cell 1 may be arranged in the vertical direction in a repeated manner to form a pixel array cell, and the pixel array cell may be arranged in the horizontal direction in a repeated manner to form a pixel array. It should be noted that, the first sub-pixel cell 11 and the second sub-pixel cell 12 may be formed in the manner shown in FIG. 1 or otherwise arranged, which should not limit the scope of the present disclosure.

In some embodiments, from left to right, a first row of a first sub-pixel cell 11 includes a red sub-pixel R and a green sub-pixel G, a second row of the first sub-pixel cell 11 includes a white sub-pixel W and a blue sub-pixel B, a first row of a second sub-pixel cell 12 includes a white sub-pixel W and a blue sub-pixel B, and a second row of the second sub-pixel cell 12 includes a red sub-pixel R and a green sub-pixel G.

In some embodiments, from left to right, a first row of a first sub-pixel cell 11 includes a red sub-pixel R and a green sub-pixel G, a second row of the first sub-pixel cell 11 includes a white sub-pixel W and a blue sub-pixel B, a first row of a second sub-pixel cell 12 includes a blue sub-pixel B and a white sub-pixel W, and a second row of the second sub-pixel cell 12 includes a green sub-pixel G and a red sub-pixel R.

In some embodiments, from left to right, a first row of a first sub-pixel cell 11 includes a red sub-pixel R and a green sub-pixel G, a second row of the first sub-pixel cell 11 includes a white sub-pixel W and a blue sub-pixel B, a first row of a second sub-pixel cell 12 includes a white sub-pixel W and a blue sub-pixel B, and a second row of the second sub-pixel cell 12 includes a green sub-pixel G and a red sub-pixel R.

In some embodiments, a first sub-pixel cell 11 and a second sub-pixel cell 12 may be a 2-by-2 matrix including a red sub-pixel R, a green sub-pixel G, a blue sub-pixel B and a white sub-pixel W arranged in a certain form. In some embodiments, a first sub-pixel cell 11 and a second sub-pixel cell 12 may be matrixes including a red sub-pixel R, a green sub-pixel G, a blue sub-pixel B and a white sub-pixel W arranged in other forms, for example, a red sub-pixel R, a green sub-pixel G, a blue sub-pixel B and a white sub-pixel W arranged to form a 1-by-4 matrix.

First Embodiment

Referring to FIG. 4, a distribution diagram of sub-pixel polarities after inserting a supplement pixel array when a pixel electrode is driven with one-column inversion mode according to a first embodiment of the present disclosure is shown. In the first embodiment, a pixel structure may include a pixel array formed by multiple pixel array cells 41 that are arranged in the horizontal direction from left to right repeatedly, and multipe supplement pixel arrays 42 are inserted into the pixel array cells 41. A supplement pixel array 42 may be inserted between two adjacent pixel array cells 41 so that sub-pixels with a same color in a same row in a same frame may not have a same polarity, that is, some of the sub-pixels with a same color in a same row in a same frame are driven by a positive voltage and some are driven by a negative voltage. In some embodiments, the supplement pixel arrays 42 may be adapted to invert sub-pixel polarities and not adapted to display in the pixel structure. The polarity of a sub-pixel in the supplement pixel arrays 42 may depend on polarities of adjacent sub-pixels and the pixel drive mode.

In some embodiments, an odd number of supplement pixel arrays 42 may be inserted between two adjacent pixel array cells 41, which also fall within the scope of the present disclosure.

Second Embodiment

Referring to FIG. 5, FIG. 5 schematically illustrates a distribution diagram of sub-pixels polarities after inserting a supplement pixel array when a pixel electrode is driven with one-column inversion mode according to a second embodiment of the present disclosure. In the second embodiment, a pixel structure may include pixel array cells 511, pixel array cells 512, and supplement pixel arrays 52. Each of the supplement pixel arrays 52 is disposed between two adjacent groups of a pixel array cell 511 and a pixel array cell 512. That is, a cycle of polarity inversion of the whole pixel structure is 16 sub-pixel columns. In the above first embodiment, left and right signals in a pixel structure may be asymmetric after inserting supplement pixel arrays into the pixel array cells, thus, an inversion function of drive IC signals can not be used. The second embodiment may solve the problem and may be used more widely.

Third Embodiment

Referring to FIG. 6, FIG. 6 schematically illustrates a distribution diagram of sub-pixel polarities after inserting a supplement pixel array when a pixel electrode is driven with a one-column inversion mode according to a third embodiment of the present disclosure. In the third embodiment, a pixel structure may include first sub-pixel cell arrays 61 formed by arranging first sub-pixel cells up and down repeatedly, second sub-pixel cell arrays 62 formed by arranging second sub-pixel cells up and down (i.e., in the vertical direction) repeatedly, and supplement pixel arrays 63. One of the first sub-pixel cell arrays 61 and one of the second sub-pixel cell arrays 62 form a pixel array cell, and one of the supplement pixel arrays 63 is disposed between the first sub-pixel cell array 61 and the second sub-pixel cell array 62 in a pixel array cell. In the embodiment, a cycle of polarity inversion of the whole pixel structure may be 8 sub-pixel columns.

Forth Embodiment

Referring to FIG. 7, FIG. 7 schematically illustrates a distribution diagram of sub-pixel polarities after inserting a supplement pixel array when a pixel electrode is driven with a one-column inversion mode according to a fourth embodiment of the present disclosure. In the fourth embodiment, a pixel structure may include first sub-pixel cell arrays 71 formed by arranging first sub-pixel cells up and down repeatedly, second sub-pixel cell arrays 72 formed by arranging second sub-pixel cells up and down (i.e., in the vertical direction) repeatedly, first supplement pixel array cells 73 and second supplement pixel array cells 74. Each of the first supplement pixel array cells 73 is disposed between one of the first sub-pixel cell arrays 71 and one of the second sub-pixel cell arrays 72. One first sub-pixel cell array 71 and one second sub-pixel cell array 72 which are adjacent to each other, form a pixel array cell, and one of the second supplement pixel array cells 74 is disposed between two adjacent pixel array cells. Each of the second supplement pixel array cells 74 may include an even number of supplement pixel arrays.

When a drive IC has surplus signal channels therein, the fourth embodiment may be employed so as to ensure that drive signals are symmetric in a pixel structure.

Referring to FIG. 8, FIG. 8 schematically illustrates a distribution diagram of sub-pixel polarities after inserting a supplement pixel array when a pixel electrode is driven with one-dot inversion mode according to one embodiment of the present disclosure. In the embodiment, a pixel structure may include pixel array cells 81 and supplement pixel arrays 82. The supplement pixel arrays 82 are inserted between the pixel array cells 81 and adapted for sub-pixel polarity inversion supplement. In the embodiment, the drive mode of the pixel structure may be one-dot inversion.

Referring to FIG. 9, FIG. 9 schematically illustrates a distribution diagram of sub-pixel polarities after inserting a supplement pixel array when a pixel electrode is driven with a two-dot inversion method according to one embodiment of the present disclosure. In the embodiment, a pixel structure may include pixel array cells 91 and supplement pixel arrays 92. The supplement pixel arrays 92 are inserted between the pixel array cells 91 and adapted for sub-pixel polarity inversion supplement. In the embodiment, the drive mode of the pixel structure may be two-dot inversion.

Referring to FIG. 10, FIG. 10 schematically illustrates a distribution diagram of sub-pixel polarities after inserting a supplement pixel array when a pixel electrode is driven with a four-dot inversion method according to one embodiment of the present disclosure. In the embodiment, a pixel structure may include pixel array cells 101 and supplement pixel arrays 102. The supplement pixel arrays 102 may be inserted between the pixel array cells 101 and adapted for sub-pixel polarity inversion supplement. In the embodiment, the drive mode of the pixel structure may be four-dot inversion.

In embodiments of the present disclosure, two sub-pixels constitute a main pixel in a pixel structure of RGBW. In conventional pixel structures of RGB, three sub-pixels constitute a main pixel. Therefore, when an IC, which is adapted to drive a pixel structure of RGB, is used to drive a pixel structure of RGBW, there may be a surplus of signal channels. Supplement pixel arrays may be set based on the surplus of the signal channels. In some embodiments, supplement pixel arrays may be set according to practical requirements of polarity inversion of a pixel structure of RGBW and a drive IC may be further designed correspondingly.

In embodiments of the present disclosure, a supplement pixel array may be adapted for sub-pixel polarity inversion supplement and not adapted for image display.

Embodiments of the present disclosure may have following advantages.

Supplement pixel arrays are disposed between pixel arrays so that sub-pixels with a same color in a same row in a same signal frame may not have a same polarity, thereby reducing flicker and horizontal crosstalk of images and improving the display quality.

Structural features described above are disclosed as exemplary embodiments only. Units which are described as separated components may or may not be separated physically. Components used for display may or may not be physical units, that is, they may be disposed on a same place or distributed in a plurality of network cells. The purpose of the present disclosure may be realized by selecting some or all of the modules according to practical requirements.

Although the present disclosure has been disclosed as above with reference to preferred embodiments thereof but will not be limited thereto. Other embodiments of the invention will readily suggest themselves to such skilled persons after a perusal of this disclosure. Therefore, the scope of the appended claims should be accorded the broadest interpretation sa as to encompass all such modifications.

What is claimed is:

1. A pixel structure, comprising:
a plurality of red sub-pixels, white sub-pixels, blue sub-pixels and green sub-pixels arranged to form a plurality of first sub-pixel cells and second sub-pixel cells,
wherein a first sub-pixel cell and a second sub-pixel cell are arranged to form a pixel cell,
wherein the pixel cells are arranged repeatedly in a vertical direction to form a plurality of pixel array cells,
wherein the pixel array cells are arranged repeatedly in a horizontal direction to form a plurality of pixel arrays, and
wherein a supplement pixel array is disposed in the pixel cells according to a preset mode, the supplement pixel array is configured to supplement polarity inversion in the pixel structure, and the supplement pixel array comprises one or more columns of sub-pixels; wherein each sub-pixel of the supplement pixel array comprises a pixel electrode and is adapted to not display, and
wherein the preset mode comprises setting sub-pixels with a same color in a same row in a same signal frame with different polarities and setting a sub-pixel in the supplement pixel array with a polarity different from that of an adjacent sub-pixel in a same row of the pixel cell.

2. The pixel structure according to claim 1, wherein the supplement pixel array is disposed between two adjacent pixel array cells or between every two pixel array cells.

3. The pixel structure according to claim 1, wherein the supplement pixel array is disposed between a pixel array formed by the first sub-pixel cells and a pixel array formed by the second sub-pixel cells.

4. The pixel structure according to claim 1, wherein the supplement pixel array comprises a first supplement pixel array and a second supplement pixel array, the first supplement pixel array being disposed between a first sub-pixel cell array formed by the first sub-pixel cells arranged in the vertical direction repeatedly, and a second sub-pixel cell array formed by the second sub-pixel cells arranged in the vertical direction repeatedly, the second supplement pixel array cell being disposed between two adjacent pixel array cells, and the second supplement pixel array comprises an even number of supplement pixel arrays.

5. The pixel structure according to claim 1, wherein the red sub-pixels, the green sub-pixels, the blue sub-pixels and the white sub-pixels are arranged in a 2-by-2 matrix to form the first sub-pixel cells and the second sub-pixel cells.

6. The pixel structure according to claim 1, wherein the red sub-pixels, the green sub-pixels, the blue sub-pixels and the white sub-pixels are arranged in a 2-by-2 matrix to form the first sub-pixel cells and the second sub-pixel cells.

7. The pixel structure according to claim 4, wherein the red sub-pixels, the green sub-pixels, the blue sub-pixels and the white sub-pixels are arranged in a plurality of 2-by-2 matrices to form the first sub-pixel cells and the second sub-pixel cells.

8. The pixel structure according to claim 5, further comprising a drive mode of the pixel structure that is a column inversion mode.

9. The pixel structure according to claim 5, further comprising a drive mode of the pixel structure that is a dot inversion mode.

10. The pixel structure according to claim 9, wherein the dot inversion mode comprises a one-dot inversion mode, a two-dot inversion mode and a four-dot inversion mode.

11. A display panel, comprising a pixel structure, wherein the pixel structure comprises:
a plurality of red sub-pixels, white sub-pixels, blue sub-pixels and green sub-pixels arranged to form a plurality of first sub-pixel cells and second sub-pixel cells,
wherein a first sub-pixel cell and a second sub-pixel cell are arranged to form a pixel cell,
wherein the pixel cells are arranged in a vertical direction repeatedly to form a plurality of pixel array cells,
wherein the pixel array cells are arranged in a horizontal direction repeatedly to form pixel arrays, and
wherein a supplement pixel array is disposed between the pixel cells according to a preset mode, the supplement pixel array is configured to supplement polarity inversion in the pixel structure, and the supplement pixel array comprises one or more columns of sub-pixels;
wherein each sub-pixel of the supplement pixel array comprises a pixel electrode and is adapted to not display, and
wherein the preset mode comprises setting sub-pixels with a same color in a same row in a same signal frame with different polarities and setting a sub-pixel in the supplement pixel array with a polarity different from that of an adjacent sub-pixel in a same row of the pixel cell.

12. The display panel according to claim 11, wherein the supplement pixel array is disposed between two adjacent pixel array cells or between every two pixel array cells.

13. The display panel according to claim 11, wherein the supplement pixel array is disposed between a pixel array formed by the first sub-pixel cells and a pixel array formed by the second sub-pixel cells.

14. The display panel according to claim 11, wherein the supplement pixel array comprises a first supplement pixel array and a second supplement pixel array, the first supplement pixel array disposed between a first sub-pixel cell array formed by the first sub-pixel cells arranged in the vertical direction repeatedly and a second sub-pixel cell array formed by the second sub-pixel cells arranged in the vertical direction repeatedly, the second supplement pixel array cell being disposed between every two adjacent pixel array cells, and the second supplement pixel array comprising an even number of supplement pixel arrays.

15. The pixel structure according to claim 11, wherein the red sub-pixels, the green sub-pixels, the blue sub-pixels and the white sub-pixels are arranged in a plurality of 2-by-2 matrices to form the first sub-pixel cells and the second sub-pixel cells.

16. The display panel according to claim 15, further comprising a drive mode of the pixel structure that is column inversion mode.

17. The display panel according to claim 15, further comprising a drive mode of the pixel structure that is dot inversion mode.

18. The display panel according to claim 17, wherein the dot inversion mode comprises a one-dot inversion mode, a two-dot inversion mode and a four-dot inversion mode.

* * * * *